(12) United States Patent
Motey

(10) Patent No.: US 11,767,777 B1
(45) Date of Patent: Sep. 26, 2023

(54) TECHNIQUES TO SYNTHESIZE GREENHOUSE GASES

(71) Applicant: Alexander Kian Motey, Los Altos, CA (US)

(72) Inventor: Alexander Kian Motey, Los Altos, CA (US)

(73) Assignee: Nataqua, Inc., Reno, NV (US)

( * ) Notice: Subject to any disclaimer, the term of this patent is extended or adjusted under 35 U.S.C. 154(b) by 0 days.

(21) Appl. No.: 17/967,261

(22) Filed: Oct. 17, 2022

Related U.S. Application Data

(63) Continuation-in-part of application No. 17/746,369, filed on May 17, 2022, now Pat. No. 11,519,311, which is a continuation-in-part of application No. 17/555,465, filed on Dec. 19, 2021, now Pat. No. 11,473,463.

(Continued)

(51) Int. Cl.
| | | |
|---|---|---|
| *F01N 3/08* | (2006.01) | |
| *B01D 53/02* | (2006.01) | |
| *B01D 53/92* | (2006.01) | |
| *B01D 53/96* | (2006.01) | |
| *B01D 53/62* | (2006.01) | |
| *B01D 53/86* | (2006.01) | |
| *B01D 53/14* | (2006.01) | |
| *B01D 53/78* | (2006.01) | |

(52) U.S. Cl.
CPC ........... *F01N 3/0807* (2013.01); *B01D 53/02* (2013.01); *B01D 53/1475* (2013.01); *B01D 53/1493* (2013.01); *B01D 53/62* (2013.01); *B01D 53/78* (2013.01); *B01D 53/86* (2013.01); *B01D 53/92* (2013.01); *B01D 53/965* (2013.01); *B01D 2239/00* (2013.01); *B01D 2257/504* (2013.01)

(58) Field of Classification Search
CPC ... F01N 3/0807; B01D 53/02; B01D 53/1475; B01D 53/1493; B01D 53/62; B01D 53/78; B01D 53/86; B01D 53/92; B01D 53/965; B01D 2239/00; B01D 2257/504
See application file for complete search history.

(56) References Cited

U.S. PATENT DOCUMENTS

| | | |
|---|---|---|
| 7,278,259 B2 | 10/2007 | Schmeichel et al. |
| 7,785,544 B2 | 8/2010 | Alward et al. |

(Continued)

FOREIGN PATENT DOCUMENTS

| | | |
|---|---|---|
| DE | 102020118917 | 1/2022 |
| EP | 2962744 | 11/2019 |
| WO | WO2021216713 | 10/2021 |

OTHER PUBLICATIONS

Webpage from clearframe.com accessed on Feb. 4, 2023.

(Continued)

*Primary Examiner* — Mickey H France
(74) *Attorney, Agent, or Firm* — Clause Eight; Michael Catania

(57) ABSTRACT

A process for capturing carbon dioxide ($CO_2$) emissions and converting the $CO_2$ into other products is disclosed herein. The process includes capturing $CO_2$ emissions from an exhaust mechanism at a $CO_2$ capture device. The process also includes converting the $CO_2$ emissions into a carbon-based product using catalysis, such as an electrochemical process or a photocatalytic process.

5 Claims, 10 Drawing Sheets

Related U.S. Application Data

(60) Provisional application No. 63/264,368, filed on Nov. 21, 2021, provisional application No. 63/237,461, filed on Aug. 26, 2021, provisional application No. 63/229,952, filed on Aug. 5, 2021, provisional application No. 63/187,876, filed on May 12, 2021, provisional application No. 63/135,850, filed on Jan. 11, 2021.

(56) References Cited

U.S. PATENT DOCUMENTS

| | | | |
|---|---|---|---|
| 8,413,420 B1 * | 4/2013 | Zaromb | B01D 53/86 205/628 |
| 9,486,733 B2 | 11/2016 | Hamad | |
| 10,823,024 B2 | 11/2020 | Chidubem et al. | |
| 2007/0282021 A1 * | 12/2007 | Campbell | C10J 3/00 568/840 |
| 2014/0044632 A1 * | 2/2014 | Zielinski | B01D 53/96 422/111 |
| 2016/0369688 A1 * | 12/2016 | Hamad | C25B 1/00 |
| 2019/0170046 A1 | 6/2019 | Hamad et al. | |
| 2020/0377435 A1 * | 12/2020 | Meltzer | C07C 29/1514 |
| 2022/0074358 A1 * | 3/2022 | Briggs, Jr. | C25B 9/00 |
| 2022/0297077 A1 * | 9/2022 | Mizuguchi | C25B 15/087 |

OTHER PUBLICATIONS

Webpage from remoracarbon.com accessed on Feb. 4, 2023.
Webpage from bioenergyinternatinal.com/adm-starts-commerical-scale-ccs-decatur-ethanol-plant accessed on Feb. 4, 2023.

* cited by examiner

TECHNIQUES TO SYNTHESIZE GREENHOUSE GASES

CROSS REFERENCES TO RELATED APPLICATIONS

The Present Application is a continuation-in-part application of U.S. patent application Ser. No. 17/746,369, filed on May 17, 2022, which is a continuation-in-part application of U.S. patent application Ser. No. 17/555,465, filed on Dec. 19, 2021, which claims priority to U.S. Provisional Patent Application No. 63/135,850, filed on Jan. 11, 2021, U.S. Provisional Patent Application No. 63/187,876, filed on May 12, 2021, U.S. Provisional Patent Application No. 63/229,952, filed on Aug. 5, 2021, U.S. Provisional Patent Application No. 63/237,461, filed on Aug. 26, 2021, and U.S. Provisional Patent Application No. 63/264,368, filed on Nov. 21, 2021, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to the capture and conversion of greenhouse gas emissions.

Description of the Related Art

Light-duty gasoline powered vehicles have been deployed everywhere for people to travel day by day to: complete their chores, get to and from work, and engage in personal activities. It has greatly enabled individual productivity from when the idea was first patented in 1886. This activity has also created a consequence of emitting greenhouse gases into Earth's atmosphere. Now, it is 2021 and our world is resolving what has become the climate crisis, where we have come together to reduce individual, corporate, and governmental greenhouse gas emissions to zero. Civilization has been able to thus far properly address reductions of greenhouse gas emissions from the production of: electricity, chemical reactions to produce goods from raw materials, energy, businesses and homes, maintenance of livestock, and usage of cars, trucks, planes, trains and ships. While our world has actively engaged itself to reduce emissions in all of these sectors through electrification, there seems to be one vital sector that is being left behind: further reduction of emissions from existing gasoline engaged light-duty vehicles.

The light-duty vehicle industry has actively sought to reduce its greenhouse gas emissions for decades. Research and development investments have gone into making an Earth friendly light-duty vehicle, such as improving the catalytic converter, replacing the internal combustion engine system with an electric system, or adding an electric based engine to the gasoline powered vehicle propulsion process. Gasoline-powered vehicles still produce significant emissions; and even if a more efficient catalytic converter or energy reducing engine system is created or improved, it won't be affordable to most people that currently own and operate a functioning gasoline powered vehicle, especially in regions where electric vehicle adoption rates are concerningly underwhelming.

As the vastly anticipated electrification of the light-duty vehicle industry is under way, major car companies have committed hundreds of billions of dollars thus far to electrify the world vehicle fleet. Currently, an estimated 1.2 billion cars on our roads are powered by fossil fuels. It is disastrously anticipated that still, new models in future years will still consume fossil fuels and produce greenhouse gas emissions.

Onboard carbon capture technology has become feasible for large internal combustion engines in industries such as maritime transport and heavy duty trucking. Attempts to capture carbon dioxide from the tailpipes of light-duty vehicles have been attempted before, but onboard conversion caused the entire process to be environmentally uneconomical. By capturing emissions and converting the emissions using a conversion device unattached to the light duty vehicle, the environmental economics become feasible.

BRIEF SUMMARY OF THE INVENTION

The present invention provides a novel solution to removing exhaust from the gas-powered vehicles that are still used by the vast majority of drivers, and converting the emissions (CO2) into a usable product.

One aspect of the present invention is a process for capturing carbon dioxide ($CO_2$) emissions from a heavy duty truck and converting the $CO_2$ into other carbon based products. The process includes capturing $CO_2$ emissions from an exhaust mechanism of a heavy duty truck at a $CO_2$ capture device. The process also includes converting the $CO_2$ emissions into a carbon-based product using catalysis, such as an electrochemical process or a photocatalytic process.

Yet another aspect of the present invention is a process for capturing carbon dioxide ($CO_2$) emissions from a passenger vehicle and converting the $CO_2$ into other products. The process includes capturing $CO_2$ emissions from an exhaust mechanism of a passenger vehicle at an onboard carbon capture system to capture and isolate pollutants and emissions. The process also includes transferring the $CO_2$ to a $CO_2$ conversion device unattached to the passenger vehicle. The process also includes converting the $CO_2$ into a carbon-based product.

One method for converting the $CO_2$ emissions into a carbon-based product includes transferring the $CO_2$ to a $CO_2$ catalyst component of the $CO_2$ conversion device. The method also includes transferring water from a water tank of the $CO_2$ conversion device to the $CO_2$ catalyst component to mix with the $CO_2$. The method also includes generating a voltage at the $CO_2$ catalyst component to react the water with the $CO_2$. The method also includes converting the $CO_2$ to the carbon-based product. The method also includes filtering the carbon-based product and water through a membrane or other chemical separation device. The method also includes transferring the carbon-based product to a product tank and the water to the water tank.

Another method for converting the $CO_2$ emissions into the carbon-based product includes transferring the $CO_2$ to a $CO_2$-to-ethanol catalyst component of the $CO_2$ conversion device. The method also includes transferring water from a water tank of the $CO_2$ conversion device to the $CO_2$-to-ethanol catalyst component to mix with the $CO_2$. The method also includes generating a voltage at the $CO_2$-to-ethanol catalyst component to react the water with the $CO_2$.

The method also includes converting the $CO_2$ to ethanol, methanol and hydrogen. The method also includes filtering the ethanol, methanol, hydrogen and water through a membrane or other chemical separation device. The method also includes transferring the ethanol to an ethanol tank and the water to the water tank.

The process includes transferring hydrogen and $CO_2$ to a $CO_2$ catalyst component, generating a voltage at the $CO_2$ catalyst component to react the hydrogen with the $CO_2$ to generate ethanol, and transferring the ethanol to the ethanol tank.

Yet another process for $CO_2$ absorption or adsorption to conversion for end-consumer consumable. The process includes attaching a hose between a tailpipe apparatus of a tailpipe of a vehicle and a $CO_2$ removal device or attaching the $CO_2$ tank to the inlet of the device designated for $CO_2$. The process also includes vacuuming the $CO_2$ from the tailpipe apparatus of the vehicle to a $CO_2$ catalyst component of the $CO_2$ removal device. The process also includes transferring water from a water tank of the $CO_2$ removal device to the $CO_2$ catalyst component to mix with the $CO_2$. The process also includes generating a voltage at the $CO_2$ catalyst component to react the water with the $CO_2$. The process also includes converting the $CO_2$ with water to an end-consumer consumable. The process also includes transferring the end-consumer consumable to a consumable tank of the $CO_2$ removal device.

Yet another aspect of the present invention is a process for capturing carbon dioxide ($CO_2$) emissions from an industrial facility and converting the $CO_2$ into other carbon based products. The process includes capturing $CO_2$ emissions from an exhaust mechanism of an industrial facility at a $CO_2$ capture device. The process also includes converting the $CO_2$ emissions into a carbon-based product using catalysis, such as an electrochemical process or a photocatalytic process. The exhaust mechanism preferably includes boilers and furnaces for industrial buildings. The industrial buildings preferably include cement plants, steel mills and power plants.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

One embodiment of the invention is capturing emissions from heavy duty trucks and converting the $CO_2$ into other products to refuel the heavy duty truck. Where the $CO_2$ conversion process is via catalysis, such as an electrochemical process or a photocatalytic process. Where the $CO_2$ is converted into C1+ products defined as chemicals having 1 carbon atom. Where the $CO_2$ is converted into C2+ products defined as chemicals having 2 carbon atoms. Where the $CO_2$ is converted to an alcohol, an alkene, an aromatic, a hydrocarbon, or an alkane.

Another embodiment is capturing emissions from heavy duty trucks and converting the $CO_2$ into other products to refuel the heavy duty truck. Where the $CO_2$ conversion process is via catalysis, such as an electrochemical process or a photocatalytic process. Where the $CO_2$ is converted into C1+ products defined as chemicals having a single carbon atom. Where the $CO_2$ is converted into C2+ products defined as chemicals having two carbon atoms. Where the $CO_2$ is converted to an alcohol, an alkene, an aromatic, a hydrocarbon, or an alkane.

After it reacts with the $CO_2 \rightarrow$ Ethanol Catalyst, the isolated $CO_2$ reacts with the solid catalyst and water, then ethanol bubbles inside of a solution composed of water.

Figure 1:
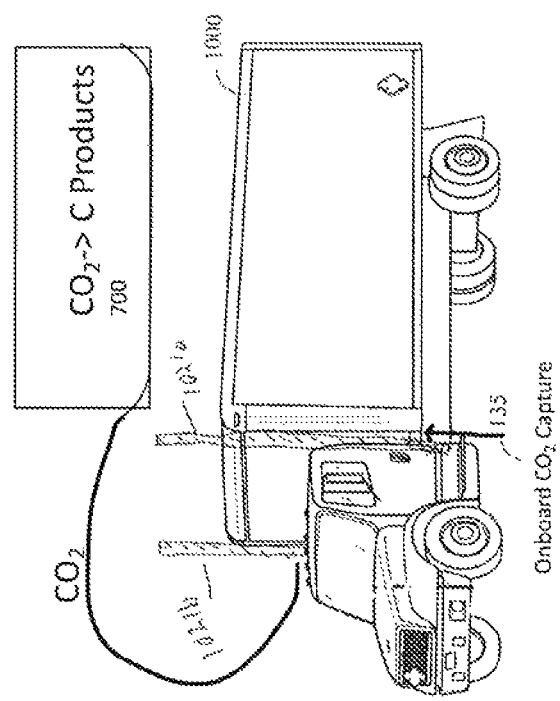
FIG. 1 is a block diagram of a $CO_2$ capture and conversion for a heavy duty truck.

FIG. 1 is a block diagram of a $CO_2$ capture and conversion for a heavy duty truck 1000. The heavy duty truck 1000 is preferably a diesel powered truck. The heavy duty truck 1000 preferably has an onboard $CO_2$ capture system 135 and stacked exhaust 1021a-b. The $CO_2$ conversion process is preferably via an catalysis, such as an electrochemical process or a photocatalytic process, at a $CO_2$ conversion component 700. The $CO_2$ is converted into C1+ products defined as chemicals having a single carbon atom. The $CO_2$ is converted into C2+ products defined as chemicals having two carbon atoms. The $CO_2$ is preferably converted to an alcohol, an alkene, an aromatic, a hydrocarbon, or an alkane.

Figure 2:
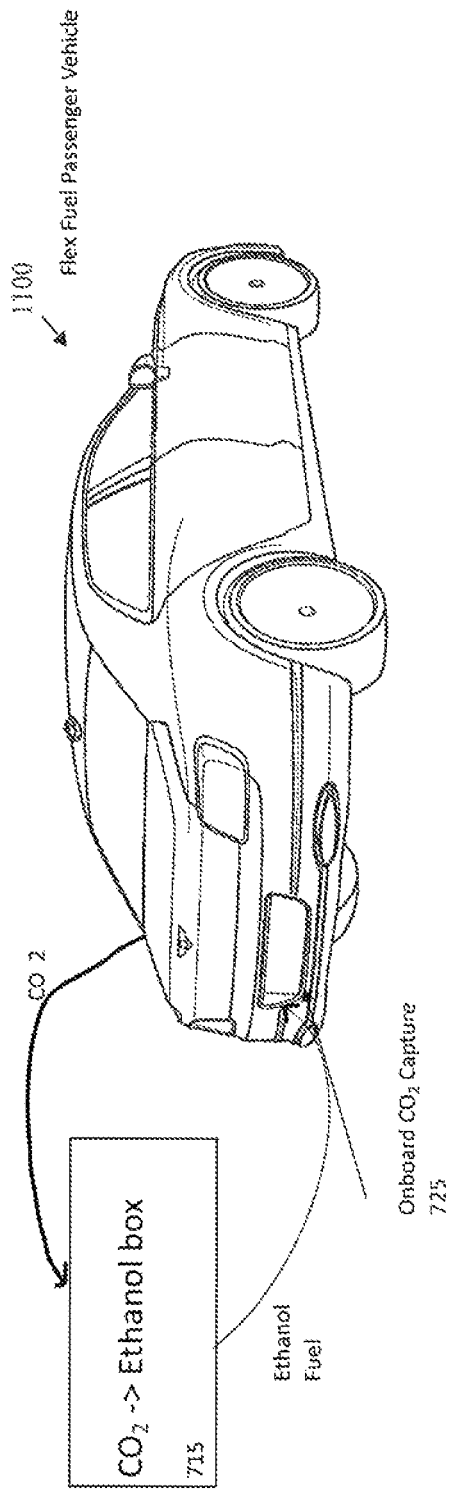
FIG. 2 is a block diagram of a $CO_2$ capture and conversion for a flex fuel passenger vehicle.

FIG. 2 is a block diagram of a $CO_2$ capture and conversion for a flex fuel passenger vehicle 1100. The flex fuel passenger vehicle 1100 has installed an onboard carbon capture system 725 to capture and isolate pollutants and emissions. The emissions captured are $CO_2$ gas. The $CO_2$ gas is vacuumed/funneled/etc. to a $CO_2$ to ethanol conversion device 715 unattached to the vehicle. The $CO_2$ is converted into C1+ products defined as chemicals having a single carbon atom. The $CO_2$ is converted into C2+ products defined as chemicals having two carbon atoms. The $CO_2$ is converted to an alcohol, an alkene, an aromatic, a hydrocarbon, or an alkane. The converted $CO_2$ is used to refuel the vehicle 1100.

Figure 3:
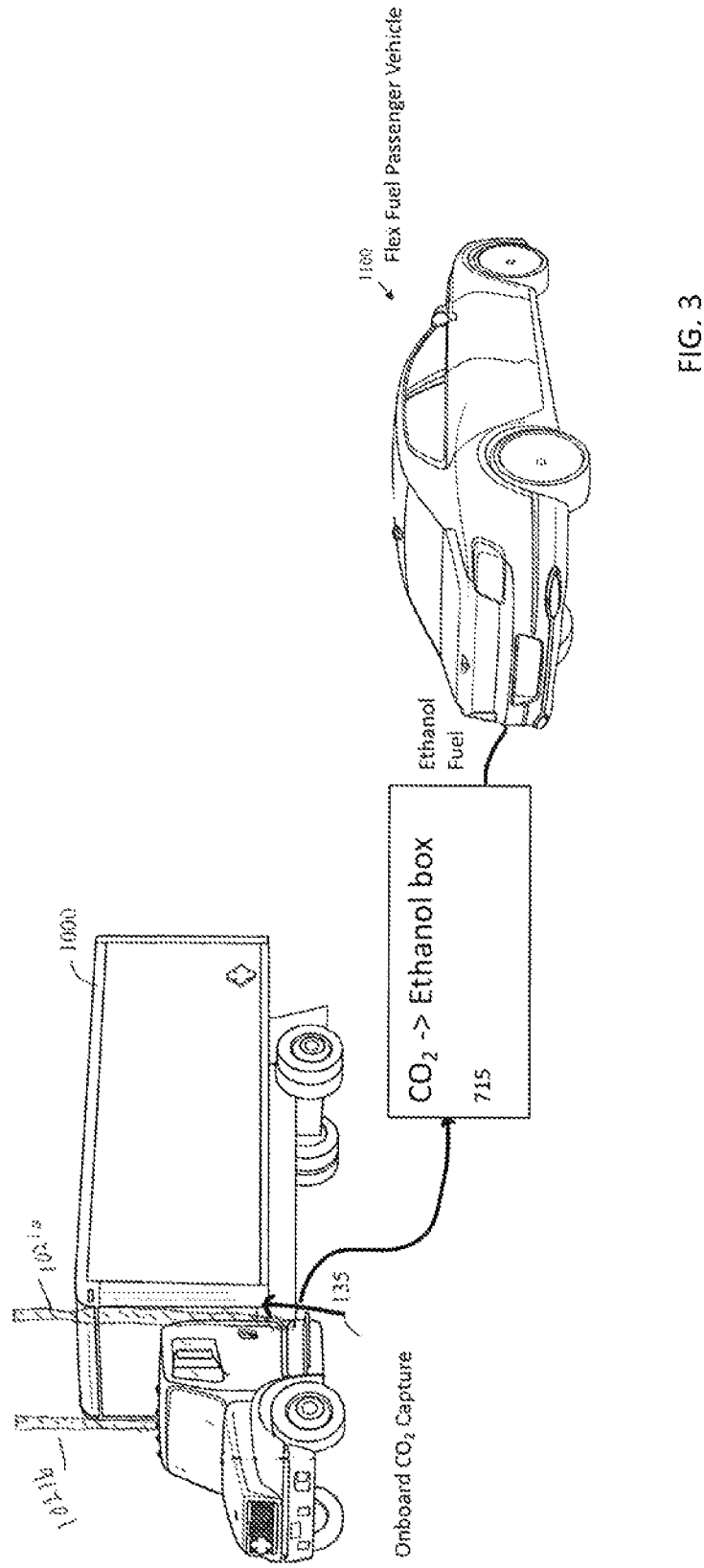
FIG. 3 is a block diagram of a $CO_2$ capture and conversion for a heavy duty truck to generate fuel for a flex fuel passenger vehicle.

FIG. 3 is a block diagram of a $CO_2$ capture and conversion for a heavy duty truck 1000 to generate fuel for a flex fuel passenger vehicle 1100. The heavy duty truck 1000 may have an onboard $CO_2$ capture system 135. The $CO_2$ conversion process is via catalysis, such as an electrochemical process or a photocatalytic process, at a $CO_2$ to ethanol conversion device 715. The $CO_2$ is converted into C1+ products defined as chemicals having a single carbon atom. The $CO_2$ is converted into C2+ products defined as chemicals having two carbon atoms. The $CO_2$ is converted to an alcohol, an alkene, an aromatic, a hydrocarbon, or an alkane. The converted $CO_2$ chemical is used to fuel the flex fuel passenger vehicle 1100.

Figure 4:
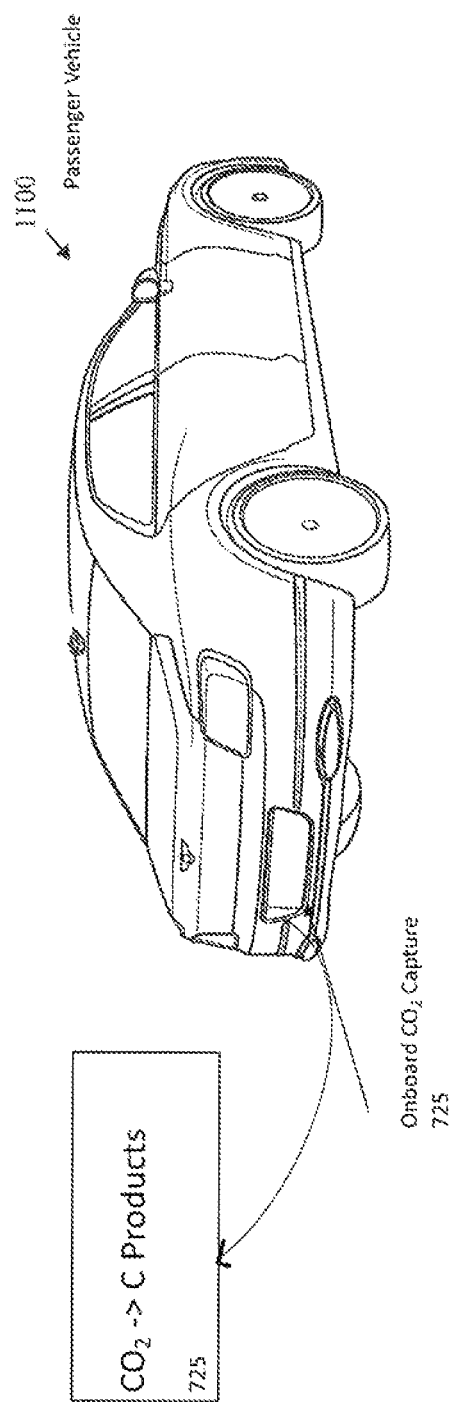
FIG. 4 is a block diagram of a $CO_2$ capture and conversion for a passenger vehicle.

FIG. 4 is a block diagram of a $CO_2$ capture and conversion for a passenger vehicle. The emissions captured are $CO_2$ gas. The $CO_2$ gas is vacuumed/funneled/etc. to a $CO_2$ conversion device 725 unattached to the vehicle 1100. The $CO_2$ conversion process is preferably via catalysis, such as an electrochemical process or a photocatalytic process, at the $CO_2$ conversion component 725. The $CO_2$ is converted into C1+ products defined as chemicals having single carbon atom. The $CO_2$ is converted into C2+ products defined as chemicals having two carbon atoms. The $CO_2$ is preferably converted to an alcohol, an alkene, an aromatic, a hydrocarbon, or an alkane. The storage tank, not shown, is preferably emptied weekly/monthly/by a chemicals company to utilize the chemicals.

Figure 5:
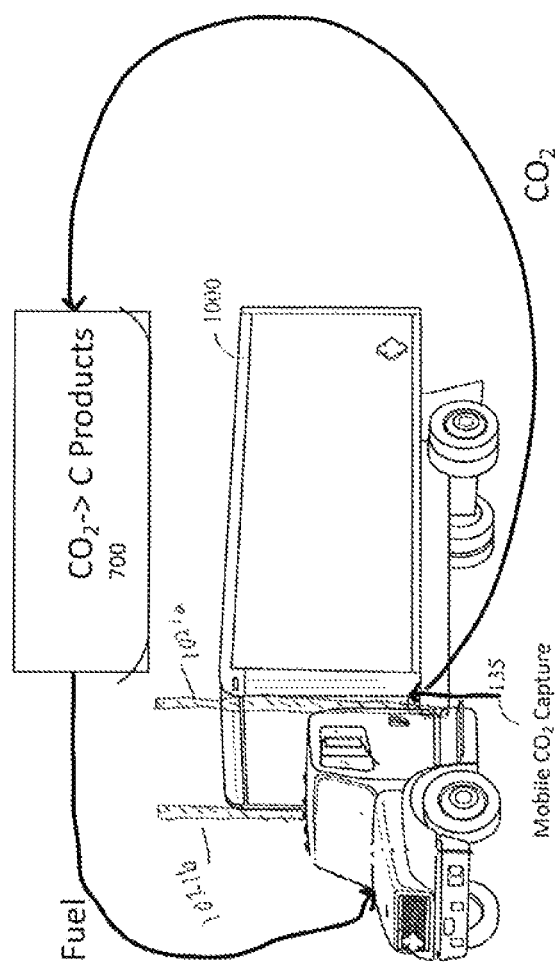
FIG. 5 is a block diagram of a mobile $CO_2$ capture and conversion for a heavy duty truck.

FIG. 5 is a block diagram of a mobile $CO_2$ capture and conversion for a heavy duty truck 1000. The heavy duty truck 1000 preferably has an onboard $CO_2$ capture system 135 and stacked exhaust 1021*a-b*. The onboard $CO_2$ capture system 135 is preferably located between the truck and the trailer, and most preferably on the back of the truck. The $CO_2$ conversion process is preferably via catalysis, such as an electrochemical process or a photocatalytic process, at a $CO_2$ conversion component 700. The $CO_2$ is converted into C1+ products defined as chemicals having a single carbon atom. The $CO_2$ is converted into C2+ products defined as chemicals having two carbon atoms. The $CO_2$ is preferably converted to an alcohol, an alkene, an aromatic, a hydrocarbon, or an alkane.

Figure 6:
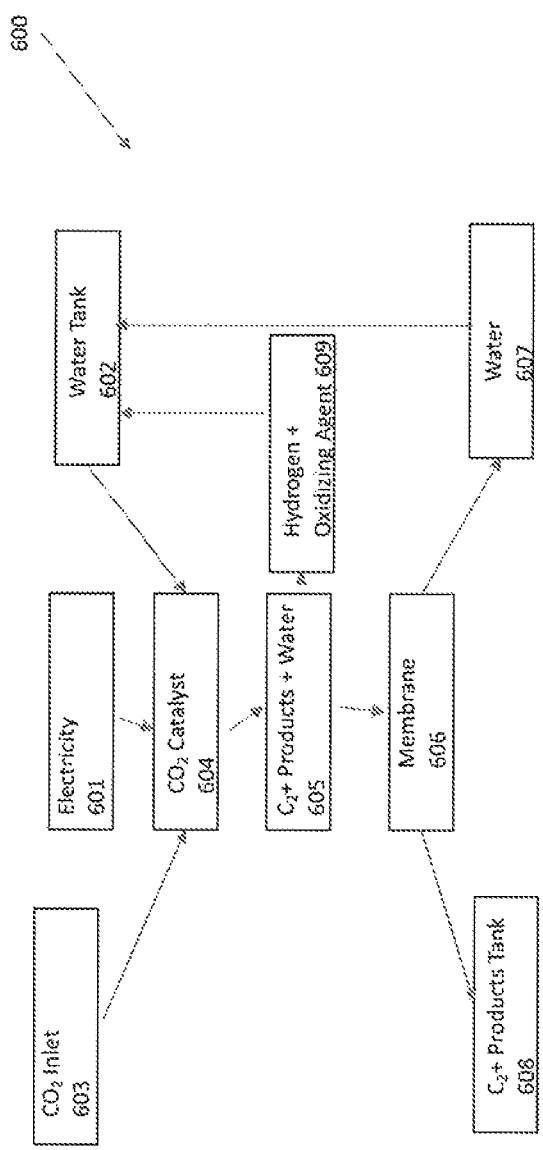
FIG. 6 is a flow chart of a method for $CO_2$ conversion.

FIG. 6 illustrates a flow chart for a method 600 for converting the $CO_2$ emissions into a carbon-based product. At block 603, $CO_2$ is transferred to a $CO_2$ catalyst component of the $CO_2$ conversion device at block 604. At block 602, water is transferred from a water tank of the $CO_2$ conversion device to the $CO_2$ catalyst component at block 604 to mix with the $CO_2$. At block 601, voltage is generated for the $CO_2$ catalyst component at block 604 to react the water with the $CO_2$. At block 605, the $CO_2$ is converted to the carbon-based product. At block 606, the carbon-based product and water is filtered through a membrane or other chemical separation device. At block 608, the carbon-based product is transferred to a product tank. At block 607, the water is transferred to the water tank.

Figure 7:
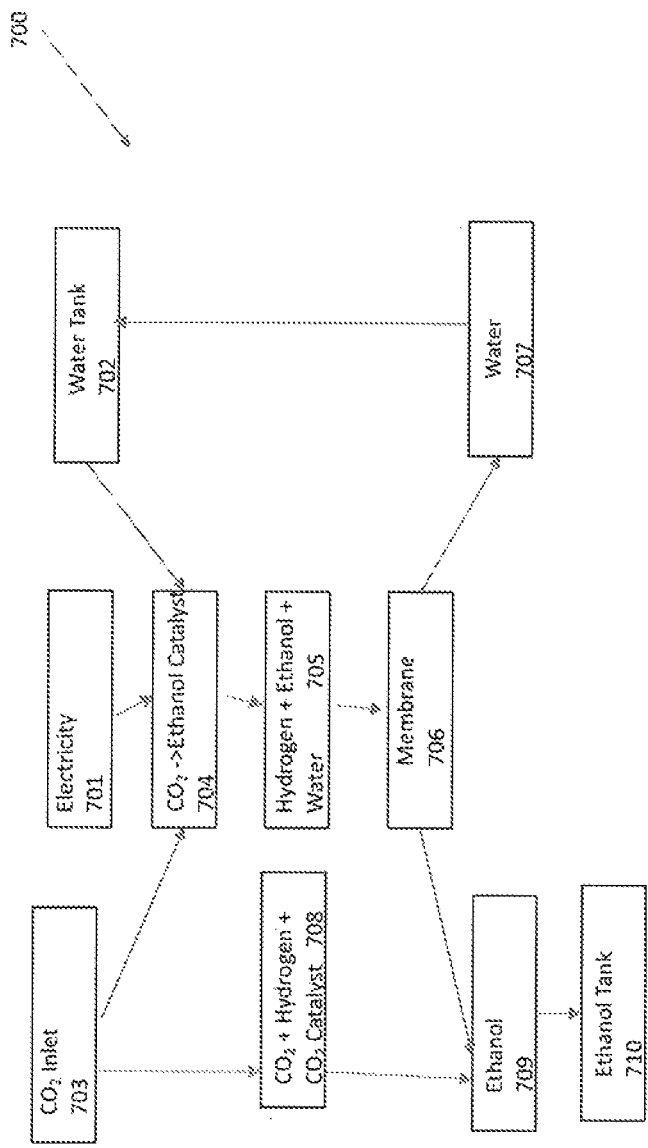
FIG. 7 is a flow chart of a method for $CO_2$ conversion to ethanol.

FIG. 7 illustrates a method for converting $CO_2$ emissions into ethanol. At block 703, the $CO_2$ to is transferred to a $CO_2$ to ethanol catalyst component of the $CO_2$ conversion device at block 704. At block 702, water is transferred from a water tank of the $CO_2$ conversion device to the $CO_2$ to the ethanol catalyst component at block 704 to mix with the $CO_2$. At block 701, a voltage is generated at the $CO_2$ to ethanol catalyst component at block 704 to react the water with the $CO_2$. At block 705, the $CO_2$ to is converted to ethanol, methanol and hydrogen. At block 706, the ethanol, methanol, hydrogen and water is filtered through a membrane or other chemical separation device. At block 709, the ethanol is transferred to an ethanol tank at block 710. At block 707, the water is transferred to the water tank at block 702.

The method of FIG. 7 also preferably includes transferring hydrogen and $CO_2$ to a $CO_2$ catalyst component, generating a voltage at the $CO_2$ catalyst component to react the hydrogen with the $CO_2$ to generate ethanol, and transferring the ethanol to the ethanol tank.

The method of FIG. 7 also preferably includes oxidizing the hydrogen to $H_2O$ using a heating element.

The method of FIG. 7 also preferably includes transferring hydrogen and $CO_2$ to a $CO_2$ catalyst component, generating a voltage at the $CO_2$ catalyst component to react the hydrogen with the $CO_2$ to generate ethanol, and transferring the ethanol to the ethanol tank.

The method of FIG. 7 also preferably includes oxidizing the hydrogen to $H_2O$ using a heating element.

Figure 8:
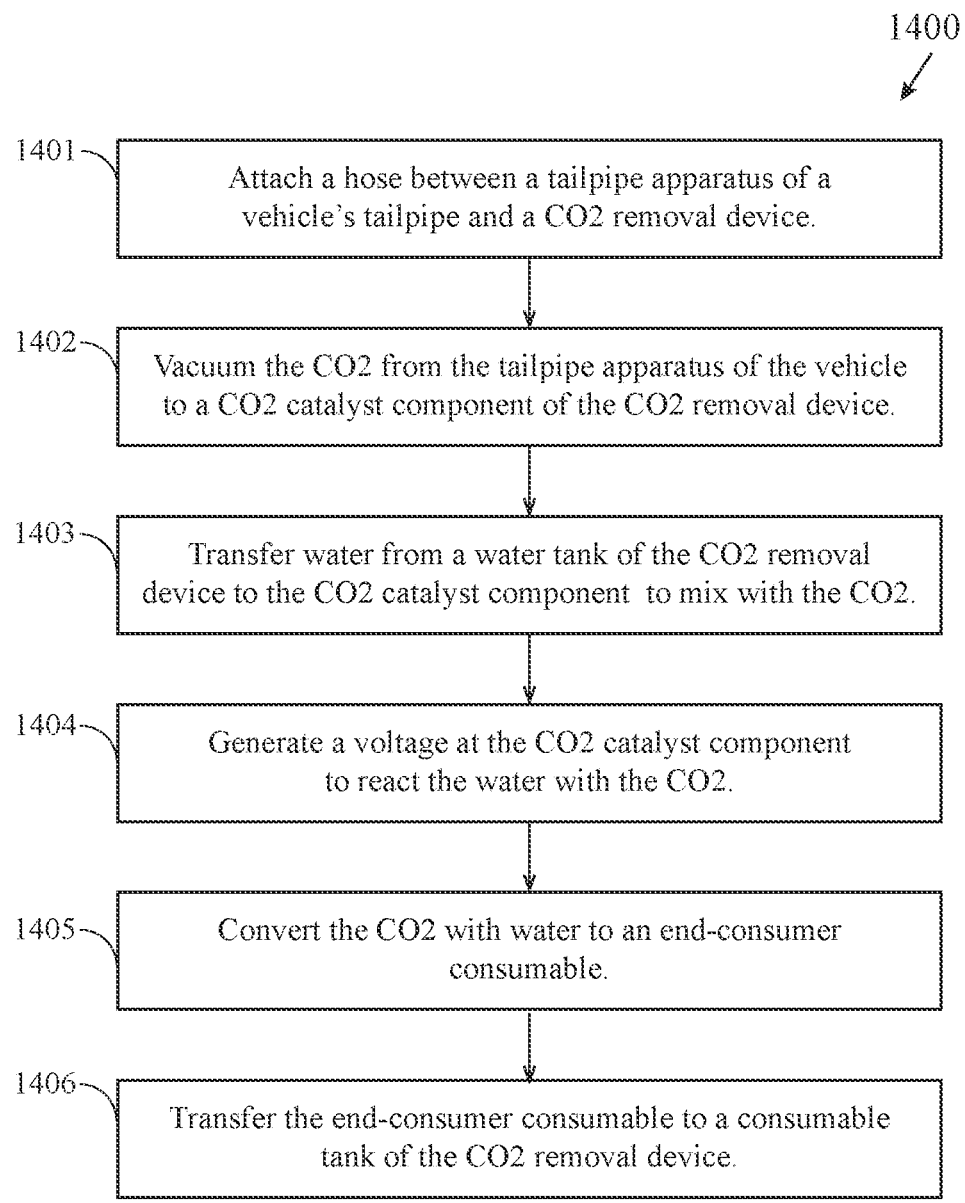
FIG. 8 is a flow chart of a method for $CO_2$ sorption to conversion for end-consumer consumable.

As shown in FIG. 8, a method for $CO_2$ absorption to conversion for end-consumer consumable is generally designated 1400. At block 1401, a hose is attached between a tailpipe apparatus of a tailpipe of a vehicle and a $CO_2$ removal device. Alternatively, the hose is attached to a device placed within a trunk of the vehicle. Alternatively, the hose or an exhaust conduit is connected to a device placed anywhere on the vehicle. At block 1402, the $CO_2$ is vacuumed from the tailpipe apparatus of the vehicle to a CO2 catalyst component of the $CO_2$ removal device. At block 1403, water is transferred from a water tank of the $CO_2$ removal device to the $CO_2$ catalyst component to mix with the $CO_2$. At block 1404, a voltage is generated at the CO2 catalyst component to react the water with the $CO_2$. At block 1405, the CO2 with the water is converted to an end-consumer consumable. At block 1406, the end-consumer consumable is transferred to a consumable tank of the $CO_2$ removal device.

Figure 9:
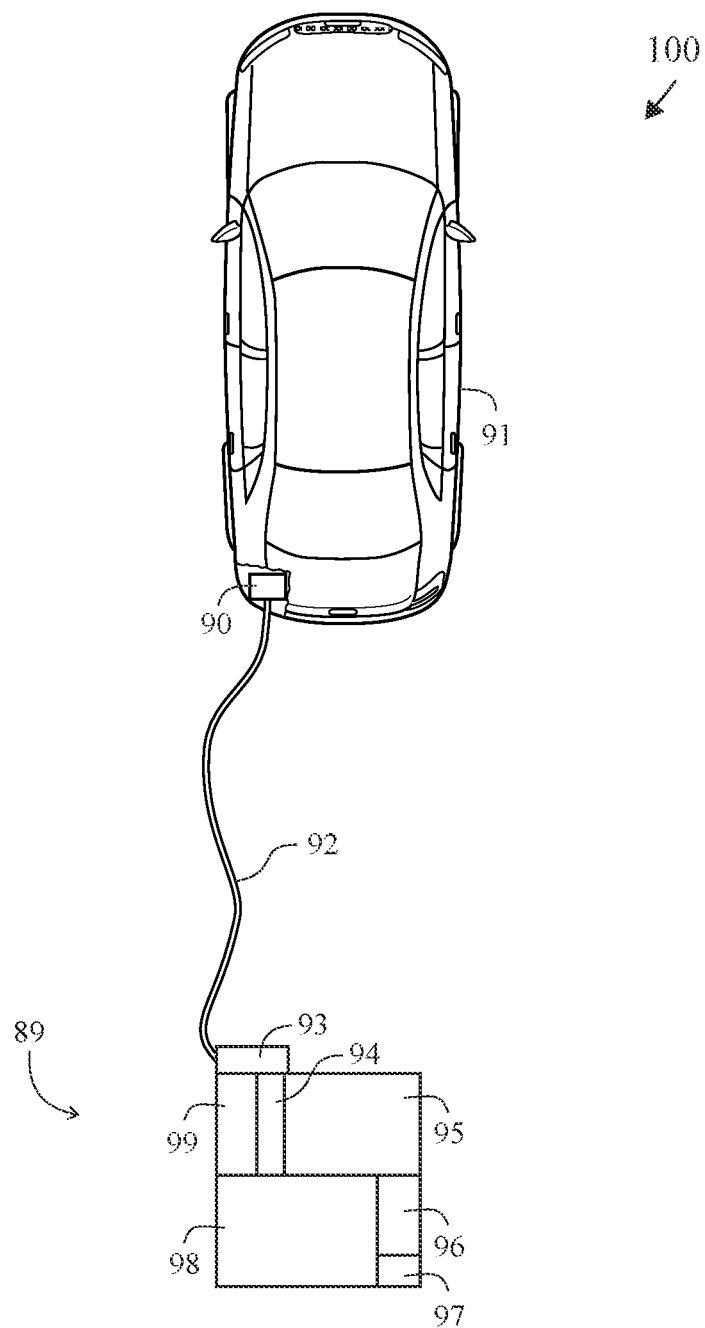
FIG. 9 is a block diagram of a vehicle and $CO_2$ storage conversion device.

FIG. 9 illustrates a block diagram for a $CO_2$ conversion system 100. The system comprises a vehicle 91, a $CO_2$ removal device 89 and a hose 92 for connection between a $CO_2$ tank tip 90 of the vehicle 91 and the $CO_2$ removal device 89. The $CO_2$ removal device 89 preferably comprises a consumable tank 98, a hose storage 93, a vacuum and other components (electrical outlet) module 94, a water tank 95, a control panel 96, an electrical inlet 97, and a $CO_2$ catalyst 99. The water tank 95 is preferably removable, however in an alternative embodiment it is stationary/fixed. The vacuum component preferably serves three purposes: to transfer the $CO_2$ from the vehicle to the $CO_2$ catalyst 99; to transfer water from the water tank 95 to the $CO_2$ catalyst 99; and to provide voltage to the $CO_2$ catalyst 99. The consumable tank 98 is preferably fully removable or alternatively, partially removable (so that it isn't carrying all of the consumable material, and only some of it is transferred to the removable section). The $CO_2$ removal device 89 is preferably on wheels. In an alternative embodiment, the hose 92 and hose storage 93 are replaced with an inlet to allow $CO_2$ from a $CO_2$ tank to be disposed into the $CO_2$ removal device 89.

Figure 10:
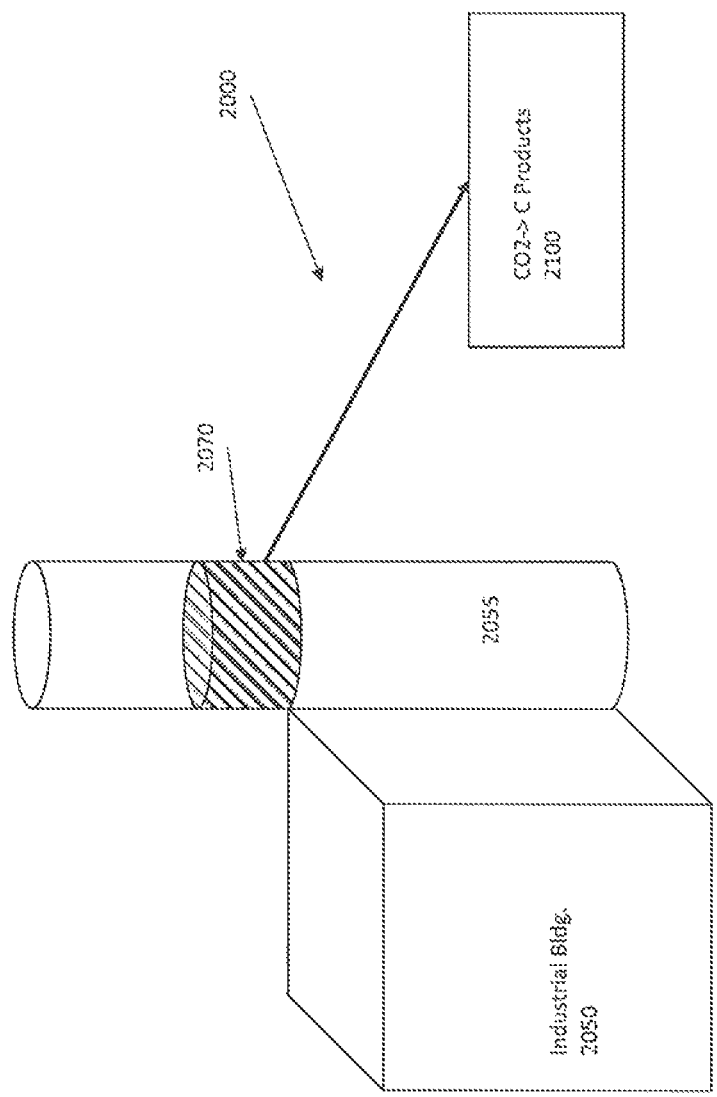
FIG. 10 is a block diagram of a $CO_2$ capture and conversion for an industrial building.

FIG. 10 illustrates a process 2000 for capturing carbon dioxide ($CO_2$) emissions from an industrial facility 2050 and converting the $CO_2$ into other carbon based products. The process includes capturing $CO_2$ emissions from an exhaust mechanism 2055 of the industrial facility 2050 at a $CO_2$ capture device 2070. The process also includes converting the $CO_2$ emissions into a carbon-based product at a carbon conversion site 2100 using catalysis, such as an electrochemical process or a photocatalytic process. The exhaust mechanism 2055 preferably includes boilers and furnaces for industrial buildings. The industrial buildings preferably include cement plants, steel mills and power plants. The industrial building may also be a commercial building or residential apartment building. The process may also be sized to use with a residential home.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing

I claim as my invention the following:

1. A process for capturing carbon dioxide ($CO_2$) emissions from a truck and converting the $CO_2$ into other carbon based products, the process comprising:
    capturing $CO_2$ emissions from an exhaust mechanism of a truck at a $CO_2$ capture device;
    transferring the $CO_2$ emissions to a $CO_2$ to ethanol catalyst component of a $CO_2$ conversion device;
    transferring water from a water tank of the $CO_2$ conversion device to the $CO_2$ to ethanol catalyst component to mix with the $CO_2$ emissions;
    generating a voltage at the $CO_2$ to ethanol catalyst component to react the water with the $CO_2$ emissions;
    converting the $CO_2$ emissions and water to ethanol, methanol and hydrogen;
    filtering the ethanol, methanol, hydrogen and water through a membrane or other chemical separation device; and
    transferring the ethanol to an ethanol tank and the water to the water tank.

2. The process according to claim 1 further comprising transferring hydrogen and $CO_2$ to a $CO_2$ catalyst component, generating a voltage at the $CO_2$ catalyst component to react the hydrogen with the $CO_2$ to generate ethanol, and transferring the ethanol to the ethanol tank.

3. The process according to claim 2 wherein the ethanol is used to refuel the truck.

4. The process according to claim 1 further comprising oxidizing the hydrogen to $H_2O$ using a heating element.

5. A process for capturing carbon dioxide ($CO_2$) emissions from an industrial facility and converting the $CO_2$ into other carbon based products, the process comprising:
    capturing $CO_2$ emissions from an exhaust mechanism of an industrial facility at a $CO_2$ capture device;
        transferring the $CO_2$ emissions to a $CO_2$ to ethanol catalyst component of a $CO_2$ conversion device;
        transferring water from a water tank of the $CO_2$ conversion device to the $CO_2$ to ethanol catalyst component to mix with the $CO_2$;
        generating a voltage at the $CO_2$ to ethanol catalyst component to react the water with the $CO_2$ emissions;
        converting the $CO_2$ emissions and water to ethanol, methanol and hydrogen;
        filtering the ethanol, methanol, hydrogen and water through a membrane or other chemical separation device; and
    transferring the ethanol to an ethanol tank and the water to the water tank.

* * * * *